United States Patent [19]
Gresham et al.

[11] Patent Number: 5,068,583
[45] Date of Patent: Nov. 26, 1991

[54] ELECTRONIC SHIFTER

[75] Inventors: Gary E. Gresham, Fort Worth; Burnis H. Tucker, Joshua, both of Tex.

[73] Assignee: Transportation Technologies, Inc., Forth Worth, Tex.

[21] Appl. No.: 567,913

[22] Filed: Aug. 15, 1990

[51] Int. Cl.⁵ .......................................... B60K 20/00
[52] U.S. Cl. ................... 318/266; 318/286; 318/466; 74/473 R
[58] Field of Search ............ 318/256, 264, 265, 266, 318/280, 282, 286, 293, 466, 467, 468; 74/473 R; 180/65.6, 65.7; 364/424.1

[56] References Cited

U.S. PATENT DOCUMENTS

| | | | |
|---|---|---|---|
| 3,858,674 | 1/1975 | Tabor | 180/65 R |
| 3,894,442 | 7/1975 | Hembree | 74/335 |
| 4,096,418 | 6/1978 | Marumoto et al. | 318/12 |
| 4,155,068 | 5/1979 | Zajichek | 340/79 |
| 4,449,416 | 5/1984 | Huitema | 74/473 R X |
| 4,660,430 | 4/1987 | Bortfeld et al. | 74/473 R X |
| 4,785,615 | 11/1988 | Leigh-Monstevens | 340/79 X |
| 4,793,458 | 12/1988 | Shealy | 74/473 R X |
| 4,827,148 | 5/1989 | Hirosawa et al. | 290/38 R |
| 4,937,749 | 6/1990 | Dunkley et al. | 364/424.1 |
| 4,938,088 | 7/1990 | Langley et al. | 74/473 R X |

*Primary Examiner*—Bentsu Ro
*Attorney, Agent, or Firm*—Baker & Botts

[57] ABSTRACT

A shifter (10) comprises control electronics (20) which eliminate mechanical switches, providing increased reliability. The shift mechanics include a double-spring (28,30) disposed between a spring guide (32). The springs are compressed responsive to a driving screw (36) under control of a bidirectional motor (12). The motor (12) is controlled by the control electronics (20).

18 Claims, 4 Drawing Sheets

ELECTRONIC SHIFTER

TECHNICAL FIELD OF THE INVENTION

This invention relates in general to automotive devices, and more particularly to an electronic shifter.

BACKGROUND OF THE INVENTION

A shifter is used to interact with the transmission or rear axle of a truck or other vehicle to divert power from the engine between different gear ratios. Typically, in the rear axle of the vehicle, there will be only two gear ratios available. The vehicle engine will reach its peak power at a given rpm. Hence, each gear ratio will obtain its maximum efficiency at a set speed. By increasing the number of gear ratios, the number of speeds at which the truck may operate at peak power is increased. A two-speed rear axle of a truck or other vehicle doubles the number of gear ratios provided by its transmission. The goal is to keep the engine at its most efficient rpm as often as possible.

The driver of the vehicle uses a switch on the gear shift lever to choose a selected gear ratio for the rear axle. The shifter mounts to the rear axle and connects through a fork to a shifting mechanism in the rear axle. To shift between gears, the shifter exerts a force on the fork which would direct the shifting mechanism, which is attached to an output shaft, toward the desired gear ratio. The interaction of the gears in the rear axle will prevent any shifting of the output shaft until the clutch is disengaged or acceleration loading of the engine is removed. At that time, the output shaft will be diverted to the new gear ratio which will engage when the clutch is engaged.

Prior art shifters suffer from significant problems. It is important that the shifter be able to reliably detect the present state of the rear axle shifting mechanism. Prior art shifters use mechanical switches to detect the present gear ratio. These mechanical switches are subject to vibrations which occur during normal operation resulting in arcing or "switch chatter." Further, the prior art shifters need over one second to load the spring which provides the impetus to the fork, thereby decreasing the responsiveness of the shifter.

Therefore, a need has arisen in the industry to provide a reliable, responsive shifter.

SUMMARY OF THE INVENTION

In accordance with the present invention, an electronic shifter is provided which substantially eliminates or prevents the problems associated with prior shifters.

The electronic shifter of the present invention includes a carriage assembly slideably engaged between first and second positions within a rigid housing. Spring means are operable to provide an impetus to the carriage assembly to move it between the first and second positions. First control means indicate a desired gear ratio selected by the operator. An electronic sensing circuitry generates an output indicative of the position of the carriage assembly within the housing. Second control means is operable to compress the spring responsive to outputs from the sensing circuitry and the first control means.

This embodiment of the present invention provides the technical advantage that the shifting may be performed electronically, i.e., without mechanical switches which are subject to malfunction.

In a second aspect of the present invention, inner and outer springs are used to provide an impetus to the carriage assembly. This aspect of the invention provides a greater force to the carriage assembly during shifting.

In a third aspect of the present invention, the springs are compressed using a motor driving a screw means. An elongate nut is disposed about the screw means such that clockwise rotation of the screw causes movement of the nut in a first direction and counterclockwise rotation of the screw causes movement of the nut in a second direction. Movement of the elongate nut results in compression of the spring. After moving the elongate nut to a desired position by a rotation of the screw means, the screw may be rotated in the opposite direction to result in a hard brake.

BRIEF DESCRIPTION OF THE DRAWINGS

For a more complete understanding of the present invention, and the advantages thereof, reference is now made to the descriptions taken in conjunction with the drawings, in which.

DETAILED DESCRIPTION OF THE INVENTION

The preferred embodiment of the present invention is best understood by referring to FIGS. 1–6 of the drawings, like numerals being used for like and corresponding parts of the various drawings.

Figures 1, 4:
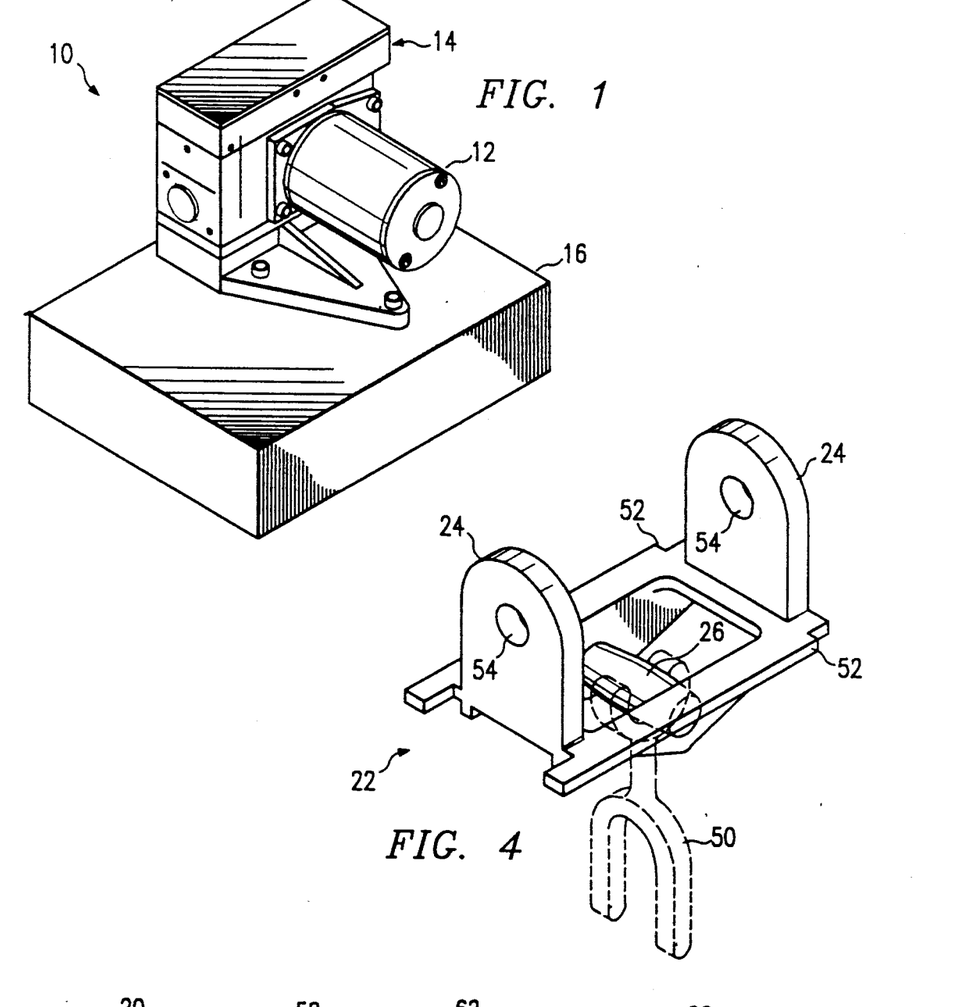
FIG. 1 illustrates a perspective view of the present invention.
FIG. 4 illustrates a perspective view of the carriage assembly.

FIG. 1 illustrates a perspective view of the shifter of the present invention as shown in a typical environment. The shifter 10 includes a motor 12 mounted on a housing 14. The housing 14 contains the shifting mechanism and the control electronics. The housing 14 is mounted on a rear axle 16.

The mechanical operation of the shifter 10 is best illustrated in connection with the FIGS. 2a–c. The shifter 10 comprises a shifting mechanism 18 controlled by the control electronics 20. The carriage assembly 22 is slideably engaged within the housing 14. The carriage assembly 22 comprises a spring carriage 24 and a fork mount 26. Inner and outer springs 28 and 30 are disposed within a spring guide 32 which is constrained within spring carriage 24. An actuator nut 34 is slideably engaged within the spring carriage 24. A driving screw 36 is threaded through actuator nut 34. The driving screw 36 is connected to worm gear 38, which is driven by worm 40. The driving screw 36 and worm gear 38 are contained within ball bearings 42 and 44 which are integral with the housing 14. A magnet 46 is disposed on the carriage assembly 22. Hall effect switches 48 and 50 are disposed on the underside of the control electronics board 20 and are operable to interact with the magnet 46.

In operation, the fork mount 26 is coupled to a fork which interacts with the shifting mechanism of the rear end or transmission. Under control of the control electronics board 20, the carriage assembly is moved back and forth within the housing 14 to switch gears within the transmission or rear end. The mechanism of moving the carriage assembly 22 within the housing 14 is illustrated in FIGS. 2b-c.

The operator of the vehicle controls a switch which allows him to select one of two gear settings, corresponding to the position of the carriage assembly 22 within the housing 14. When the operator chooses a setting, the control electronics board 20 decides whether or not the carriage assembly 22 needs to be moved, and if so, provides the control signals to move the carriage.

Figure 2A:
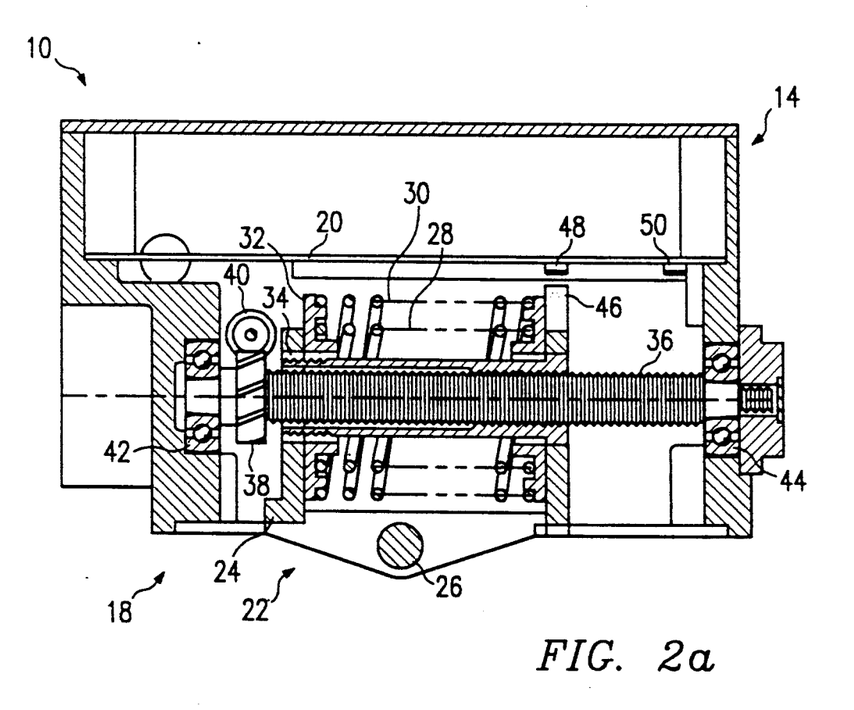
FIGS. 2a–c illustrate cross-sectional side views of the shifter the present invention at various stages during a shift operation.
Figure 2B:
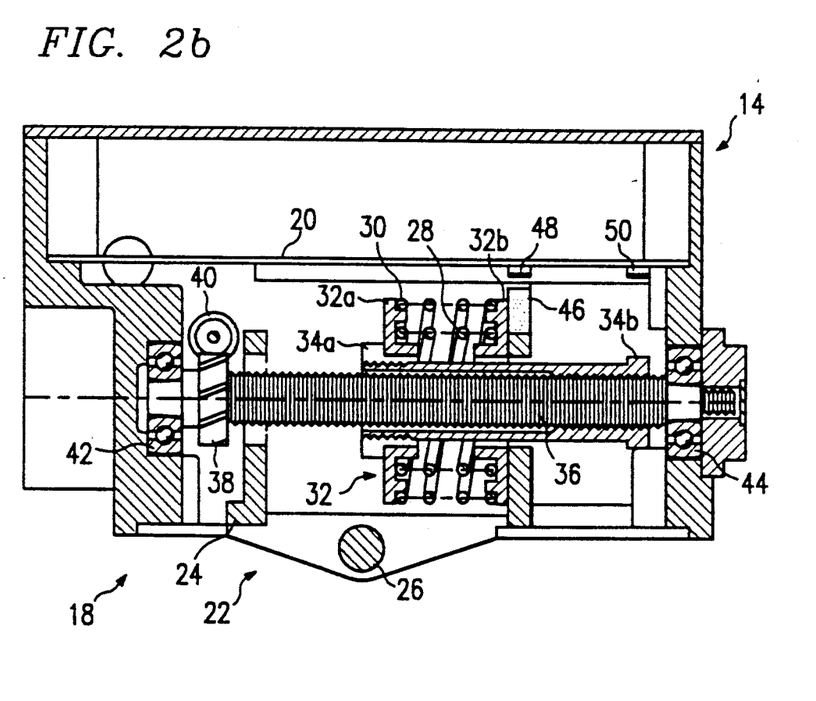
Figure 2C:
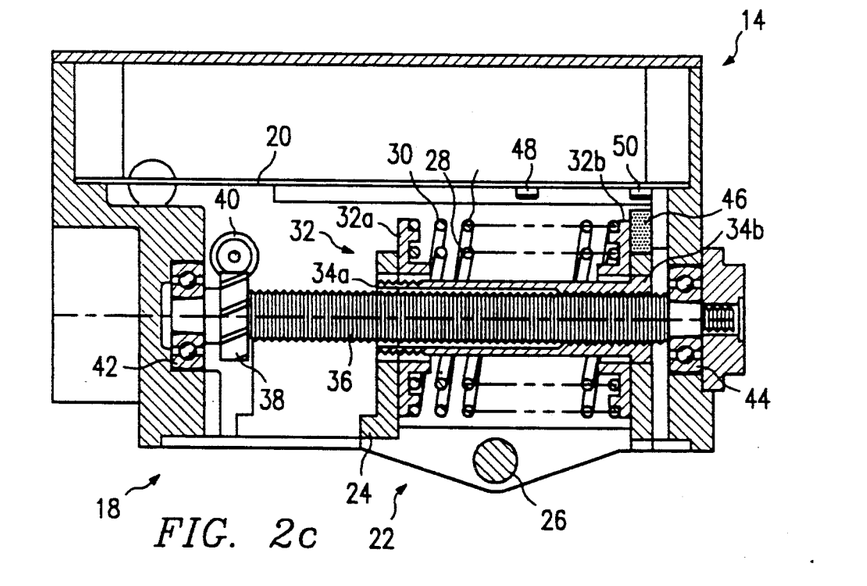

FIGS. 2a-c illustrate a carriage movement from hall effects switch 48 to hall effect switch 50. To effectuate a move, the worm 40 is rotated to drive the worm gear 38, thereby turning the driving screw 36. As the driving screw 36 turns, the actuator nut 34 is forced to the right. The left portion of the actuator nut 34a presses against the left side of the spring guide 32a, causing the inner and outer springs 28 and 30 to compress. At this point, the carriage assembly 22 cannot move, since the force exerted by the gears in the transmission (which are still engaged) overcomes the compressive force of the springs 28 and 30. Hence, the right side of the spring guide 32b cannot move.

When the operator disengages the clutch or removes the engine acceleration loading, the force between gears is released and the carriage is forced to the right, as illustrated in FIG. 2c. When the clutch is engaged, the gears will be in the correct position for the selected setting.

To return to the first setting, the worm 40 is rotated in the opposite direction, thereby causing the actuator nut 34 to move to the left. The right side of the actuator nut 34b will compress the springs 28 and 30 and, when the clutch is disengaged, the carriage assembly 22 will move to the left.

Figure 3:
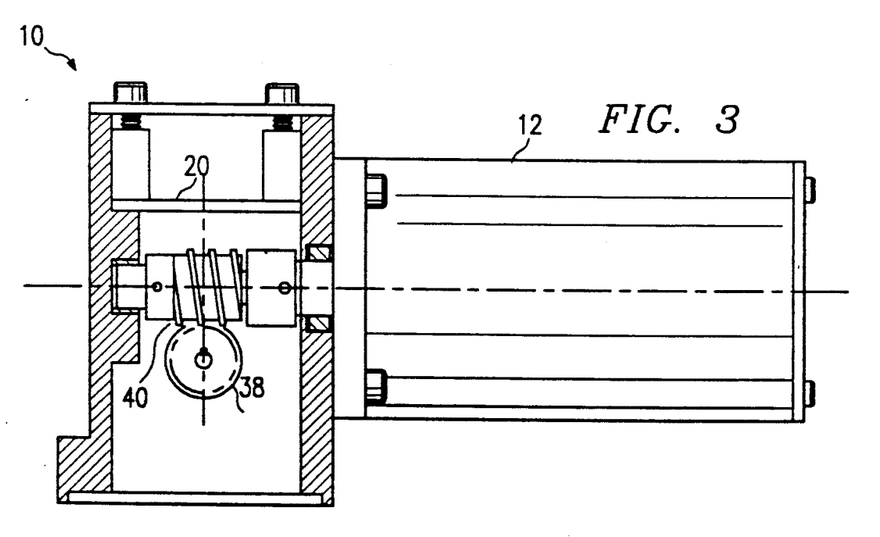
FIG. 3 illustrates a cross-sectional view of the interaction between the motor and the worm gear of the present invention.

FIG. 3 illustrates a side view of the shifter 10, showing the operation of the worm 40. The motor 12, under control of the control electronics board 20, drives the worm 40 either clockwise or counterclockwise. Accordingly, the worm 40 drives the worm gear 38 clockwise or counterclockwise.

FIG. 4 illustrates the carriage assembly 22. The carriage assembly 22 includes a post 26 which interacts with a shifting fork 50 (shown in phantom). Extended portions 52 slide within associated slots formed in the housing 14. Holes 54 are formed in the spring carriages 24; the actuator nut 34 is slideably engaged therein.

In operation, the carriage assembly 22 is forced back and forth within the housing 14. The shifting fork 50, which is coupled to the carriage assembly 22 drives the shifting mechanism synchronizer back and forth in the gear box responsive to movements of the carriage assembly.

Figure 5:
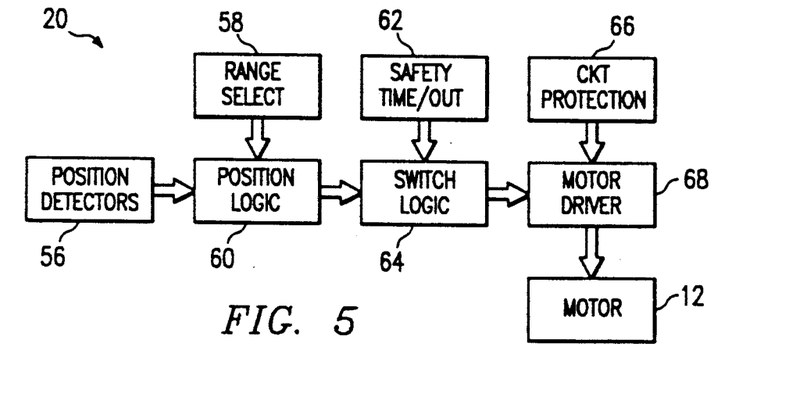
FIG. 5 illustrates a block diagram of the circuitry used in the present invention.

FIG. 5 illustrates a block diagram of the control electronics 20. The position detectors 56 and range select circuitry 58 communicate with position logic 60. Position logic 60 and safety time out circuitry 62 communicate with switch logic circuitry 64. Switch logic circuitry 64 and circuit protection 66 communicate to a motor driver 68. The motor driver 68 drives the motor 12.

In operation, the position detectors 56 detect the position of the carriage assembly 22 within the housing 14. In the preferred embodiment, the position detectors 56 are hall effect switches (48 and 50 in FIGS. 2a-c) which interact with the magnet 46. The range select circuitry 58 is operated by the driver to select the desired gear ratio. The position logic 60 interacts with the position detectors 56 and the range select circuitry 58 to determine whether the carriage assembly 22 should be shifted within the housing 14 or whether it should remain stationary. The position logic 60 causes the switch logic to output a signal to the motor driver 68 which instructs the motor driver to turn the motor 12 in one direction or the other (assuming that the carriage assembly 22 is to be shifted). The safety time out circuitry 62 disables the motor driver 68 after a set time period (unless previously disabled by the position detector 56) in which the springs 28 and 30 should have been properly compressed by the spring guide 32. Circuitry protection 66 is used to prevent damaging currents in the circuit. The motor driver 68 controls the direction of rotation of the motor 12.

Figure 6:
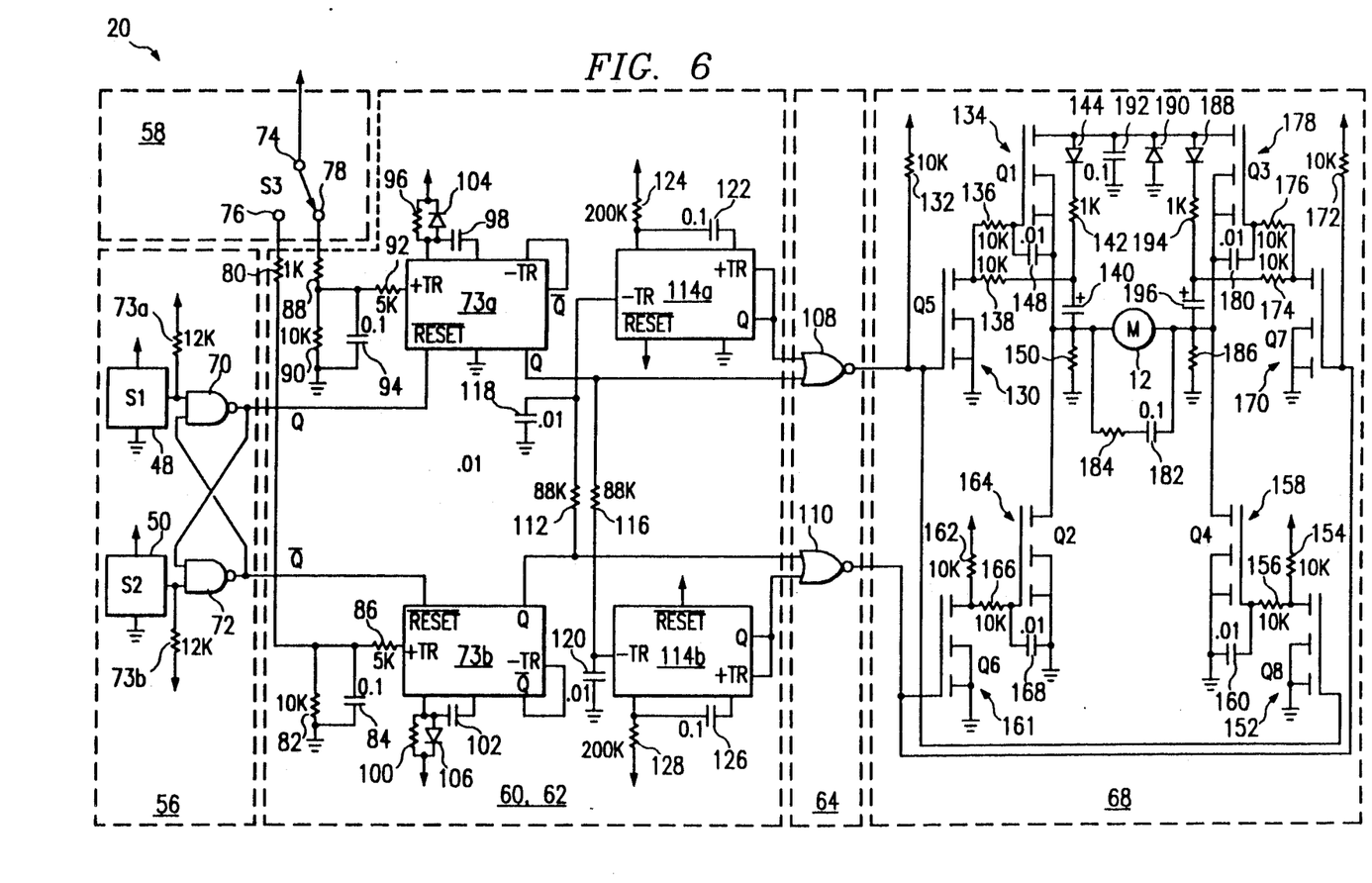
FIG. 6 illustrates a schematic representation of the circuitry used in the present invention.

FIG. 6 illustrates a schematic representation of the control electronics 20. The hall effect switches 48 and 50 are each connected to an input of a respective NAND gate 70 and 72 and to respective pull-up resistors 73a and b. The pull-up resistors are connected between the respective input and $V_{cc}$. The output of each NAND gate is connected to the input of the other NAND gate; hence, the output of NAND gate 70 is connected to the input of NAND gate 72 and the output of NAND gate 72 is connected to the input of NAND gate 70. The output of the NAND gates 70 and 72 are each connected to the reset port of a dual precision mono-stable multi-vibrator 73 a or 73b, such as the CD4538B manufactured by the RCA Corporation.

A switch 74 is operable to connect either node 76 and node 78 to $V_{cc}$. For purposes of this specification, $V_{cc}$ is considered to be the output of the circuit protection circuitry 66 which supplies a sufficiently clean twelve volt signal. The circuit protection circuitry is described in connection with FIG. 7. Node 76 is connected to 1K resistor 80 which is connected to a 10K resistor 82 and a 0.1 μF capacitor 84. The opposite ends of resistor 82 and capacitor 84 are connected to ground. The node connecting resistor 80 to resistor 82 and capacitor 84 is connected to the leading edge trigger of the multi-vibrator 73b through a 5k resistor 86. Node 78 is connected to a 1K resistor 88, the other end of which is connected to a 10K resistor 90, a 5K resistor 92 and a 0.1 μF capacitor 94. The opposite ends of the resistor 90 and the capacitor 94 are connected to ground. The opposite end of resistor 92 is connected to the leading edge trigger of multi-vibrator 73a. An external resistor 96 and a external capacitor 98 are connected to the timing ports of the multi-vibrator 73a. A like valued resistor 100 and capacitor 102 are connected to the timing ports of the multi-vibrator 73b. Diodes 104 and 106 are connected in parallel with the resistor 96 and 100, respectively. $V_{cc}$ is connected to the opposite ends of resistor 96 and diode 104 and resistor 100 and diode 106.

The $V_{ss}$ port of the multi-vibrators 73a-b is connected to ground. The negative edge trigger of each multi-vibrator 73a-b is connected to the Q port of the multi-vibrator. The Q outputs of the multi-vibrators 73a-b are each connected to an input of a respective NOR gates 108 and 110. An 88K resistor 112 connects the Q output of multi-vibrator 73b with the trailing edge trigger port of a multi-vibrator 114a. An 88K resistor 116 couples the Q output of multi-vibrator 73a to the trailing edge trigger of a multi-vibrator 114b. Capacitors 118 and 120 having a value of 0.01 µF are connected to the trailing edge trigger port of respective multi-vibrators 114a and 114b. The opposite edges of capacitors 118 and 120 are connected to ground. The reset port of each multi-vibrator 114a-b is connected to $V_{cc}$. $V_{ss}$ of the multi-vibrators 114a-b is connected to ground. The leading edge trigger port and the Q output of multi-vibrator 114a are connected together and to the second input of NOR gate 108. Similarly, the leading edge trigger and Q output of multi-vibrator 114b are connected together and to the second input of NOR gate 110. A capacitor 122 and resistor 124 are connected to the timing ports of the multi-vibrator 114a, the capacitor 122 having a value of 0.1 mF and the resistor 124 having a value of 200k. A capacitor 126 and a resistor 128 having the same values as capacitor 122 and resistor 124, are connected to the timing ports of multivibrator 114b.

The output of NOR gate 108 is connected to the gate of an NMOS transistor 130 and to $V_{cc}$ via a 10K resistor 132. A first source/drain of the NMOS transistor 130 is connected to the gate of an NMOS transistor 134 via a 10K resistor 136. The same source/drain is connected to the first end of the 10K resistor 138. The opposite end of the resistor 138 is connected to the first end of the capacitor 140 and the first end of a resistor 142. The other end of resistor 142 is connected to the cathode of a diode 144, the anode of which is connected to the first source/drain of the NMOS transistor 134. The other end of the capacitor 140 is connected to a first terminal of the motor 12. A capacitor 148 is connected between the gate of NMOS transistor 134 and the first terminal of the motor 12. A resistor 150 is connected between the first terminal of the motor 12 and ground. The second source/drain of the NMOS transistor 134 is also connected to the first terminal of the motor 12. The second source/drain of NMOS transistor 130 is connected to ground.

The output of NOR gate 108 is also connected to the gate of an NMOS transistor 152, having one source/drain connected to ground and the other source/drain connected to $V_{cc}$ via a resistor 154 and to a 10K resistor 156. The other end of the 10K resistor 156 is connected to the gate of an NMOS transistor 158. The first source/drain of the NMOS transistor 158 is connected to ground. The gate of the NMOS transistor 158 is connected to ground via a 0.01 µF capacitor 160. The output of the second NOR gate 110 is connected to the gate of an NMOS transistor 161. A first source/drain of NMOS transistor 161 is connected to ground. The second source/drain of NMOS transistor 160 is connected to $V_{cc}$ via a 10K resistor 162. The second source/drain of NMOS transistor 162 is further connected to a gate of an NMOS transistor 164 via a 10K resistor 166. The gate of NMOS transistor 164 is connected to its first source/drain and to ground via a 0.01 µF capacitor 168. The second source/drain of NMOS transistor 170 is connected to the first terminal of the motor 12. The output of NOR gate 110 is further connected to the gate of an NMOS transistor 170 and to $V_{cc}$ via pull-up resistor 172. A first source/drain of NMOS transistor 170 is connected to ground. A second source/drain of NMOS transistor 160 is connected to the first end of a pair of 10K resistors 174 and 176. The other end of resistor 176 is connected to the gate of NMOS transistor 178. A first source/drain of NMOS transistor 178 is connected to the second source/drain of NMOS transistor 158 and is further connected to the gate of NMOS transistor 178 via a 0.01 µF capacitor 180. The second terminal of the motor 12 is connected to its first terminal via a 0.1 µF capacitor 182 and a resistor 184 connected in series. A 120 ohm resistor 186 is connected between the second terminal of the motor 12 and ground. The first source/drains of NMOS transistor 178 and the second source/drain of NMOS transistor 158 are also connected to the second terminal of the motor 12.

The second source/drain of NMOS transistor 178 is connected to the anode of a diode 188, the cathode of diode 190, the first end of capacitor 192, the anode of diode 144 and the first source/drain of NMOS transistor 134. The anode of diode 190 is connected to ground as is the second end of capacitor 192. The cathode of diode 188 is connected to the first end of a resistor 194, the second end of which is connected to the second end of resistor 174 and to the first end of capacitor 196. The second end of capacitor 196 is connected to the second terminal of motor 12.

It should be noted, that the resistor and capacitor values are given for illustrative purposes only, and may be changed to suit the particular need of the shift mechanics. Further, other implementations for the various functions of the control electronics could be implemented using other logical devices.

In operation, the hall effect switches 48 and 50 produce a low output when the magnet is positioned therebelow. Hence, only one switch 48 or 50 may be producing a low output at any given time, while the opposite switch will be producing a high output. When the magnet is in between the hall effect switches 48 and 50, both switches will produce a high output. The combination of NAND gates 70 and 72 implements a flip-flop which causes a high output from NAND gate 70 when the hall effect switch 48 is low and a high output from the NAND gate 72 when the hall effects switch 50 goes low. Whenever one NAND gate outputs a high signal, the other NAND gate outputs a low signal.

The trailing edge triggers of the multi-vibrators 73a-b are connected to the respective Q outputs to implement leading edge triggering of the multi-vibrators. When the switch 74 is switched such that $V_{cc}$ is connected to node 78, the leading edge trigger port is enabled producing a pulse at the Q output of multi-vibrator 73a for a period determined by the values of the capacitor 98 and the resistor 96. This pulse may be cut short if the output of NAND gate 70 is pulled low prior to normal termination of the pulse. If the output of NAND gate 70 is low when the switch is connected to node 78, then the pulse from the multi-vibrator 73a will not be generated, indicating that the carriage assembly 2 is already in the desired position.

Similarly, a switch to node 76 will generate a pulse of predetermined length from the Q output of multivibrator 73b, so long as the output of NAND gate 72 is high. Hence, multi-vibrators 73a-b, create the logic signals for turning the motor 12 in one direction or the other.

Multi-vibrators 114a-b are connected to the Q outputs of multi-vibrators 73a-b, such that at the end of the pulse from the Q output, a short pulse is generated which will momentarily cause the motor 12 to rotate in the opposite direction, thereby producing a hard brake on the rotational movement of the worm 40, and hence, the worm gear 38. The duration of this pulse is determined by capacitors 122 and 126 and by resistors 124 and 128.

The output of the NOR gates 108 and 110 determine the direction of the motor rotation. A low output signal from NOR gate 108 causes clockwise rotation of the motor 12 and a low output signal from NOR gate 110 causes a counterclockwise rotation of the motor 12. No rotation occurs when the output of both NOR gates 108 and 110 are high.

It is important to note that the control electronics 20 contain no mechanical switches (except for the switch 74 which is on the gear shift lever in the cab of the vehicle which is not subject to harsh environmental conditions). Thus, reliability problems caused by mechanical failure of components in the shifter are eliminated. Thus, the shifter of the present invention provides long term, high reliability operation.

The electronic shifter of the present invention also provides the technical advantage increased speed. Because of the shifter's unique mechanics, the carriage assembly may be loaded in 0.7 seconds, as opposed to other shifters which require at least one second. This provides a more responsive shift mechanism for the driver.

Figure 7:
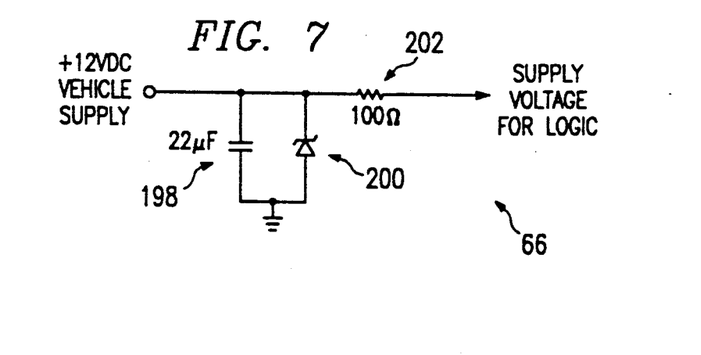
FIG. 7 illustrates a schematic representation of the circuit protection circuitry.

FIG. 7 illustrates a schematic representation of the circuit protection circuitry 66. The circuit protection circuitry 66 receives a twelve volt DC from the vehicle power supply. A capacitor 198 and a diode 200 are connected in parallel between the twelve volt vehicle supply and ground; the diode 200 is oriented such that its anode is connected to ground. A resistor 202 has a first terminal connected to the twelve volt supply. The second terminal of the resistor 202 provides the supply voltage for the logic illustrated in FIGS. 5 and 6. The output of the circuit protection circuitry 66 should be approximately twelve volts, since the voltage drop over the resistor 202 will be relatively small.

Although the present invention has been described in detail, it should be understood that various changes, substitutions and alterations can be made herein without departing from the spirit and scope of the invention as defined by the appended claims.

What is claimed is:

1. Apparatus for shifting between gear ratios comprising:
   a rigid housing;
   a carriage assembly slideably engaged between first and second positions within said housing;
   spring means operable to provide an impetus to said carriage assembly to move said carriage assembly between said first and second positions;
   first control means for indicating a desired gear ratio selected by an operator;
   electronic sensing circuitry for generating an output indicative of the position of the carriage assembly within the housing; and
   second control means for compressing said spring means responsive to said sensing circuitry and said first control means.

2. The apparatus of claim 1 wherein said electronic sensing circuitry comprises hall effect switches coupled to said housing and a magnet coupled to said carriage assembly.

3. The apparatus of claim 1 wherein said spring means comprises inner and outer springs, said inner spring disposed within said outer spring.

4. The apparatus of claim 1 wherein said first control means comprises a switch.

5. The apparatus of claim 1 wherein said second control means comprises:
   a screw means;
   a motor coupled to said screw means and operable to selectively rotate said screw means clockwise or counterclockwise;
   an elongate nut means coupled to said screw means such that said nut means moves in a first direction responsive to a clockwise rotation of said screw means and moves in a second direction responsive to a counterclockwise rotation of said screw means, said nut means operable to compress said spring means responsive to said movement in said first or second directions; and
   third control means for controlling the motor.

6. The apparatus of claim 5 wherein said third control means comprises control circuitry for causing said motor to selectively rotate said screw means clockwise or counterclockwise responsive to outputs from said first control means and said electronic sensing circuitry.

7. The apparatus of claim 6 wherein said control circuitry further comprises braking circuitry to cause said motor to rotate said screw means in an opposite direction to stop movement of said nut means.

8. The apparatus of claim 6 wherein said control circuitry is operable to cause said motor to stop rotating said screw means after a predetermined length of time.

9. The apparatus of claim 6 wherein said control circuitry is operable to cause said motor to stop rotating said screw means responsive to a signal from said electronic sensing circuitry indicating a change in position of said carriage assembly.

10. The apparatus of claim 2 wherein said electronic sensing circuitry further comprises a flip-flop operable to generate a first output signal when said magnet is proximate a first hall effect switch and a second output signal when said magnet is proximate a second hall effect switch.

11. The apparatus of claim 6 wherein said control circuitry comprises a first and second multi-vibrators, said first multi-vibrator operable to generate a pulse of predetermined length in response to a first signal from said first control means and said second multi-vibrator operable to generate a pulse of predetermined length in response to a second output signal from said first control means.

12. The apparatus of claim 11 wherein said first and second multi-vibrators are operable to suppress said pulse responsive to a signal from said sensing circuitry.

13. The apparatus of claim 11 wherein said control circuitry further comprises third and fourth multivibrators, said third multi-vibrator being operable to generate a brake pulse after the end of a pulse from said first multi-vibrator and said fourth multi-vibrator being operable to generate a brake pulse after the end of a pulse from said second multi-vibrator.

14. The apparatus of claim 13 wherein control circuitry further comprises circuitry to cause clockwise rotation of said motor responsive to a pulse from said first or fourth multi-vibrators and counterclockwise rotation of said motor responsive to a pulse from said second or third multi-vibrators.

15. Apparatus for shifting between gear ratios comprising:
   a rigid housing;
   a carriage assembly slideably engaged between first and second positions within said housing;

inner and outer springs to drive said carriage assembly between said first and second positions;

first control means to generate an output responsive to an input indicating a desired gear ratio;

sensing circuitry for generating an output indicative of the position of the carriage assembly within the housing;

a motor attached to said housing;

a screw driven clockwise or counterclockwise by said motor;

an elongate nut driven in a first direction responsive to a clockwise rotation of said screw and driven in a second direction responsive to a counterclockwise rotation of said screw; and control circuitry to control said motor.

16. The apparatus of claim 15 wherein said sensing circuitry comprises electronic sensing circuitry.

17. The apparatus of claim 16 wherein said sensing circuitry comprises hall effect switches mounted in a fixed relation to said housing and a magnet mounted on said carriage assembly.

18. The apparatus of claim 15 wherein said control circuitry includes circuitry operable to cause clockwise rotation of said screw responsive to a first output from said first control means and operable to cause counterclockwise rotation of said screw responsive to a second output of said first control means.

* * * * *

UNITED STATES PATENT AND TRADEMARK OFFICE
CERTIFICATE OF CORRECTION

PATENT NO. : 5,068,583
DATED : November 26, 1991
INVENTOR(S) : Gary E. Gresham and Burnis H. Tucker It is certified that error appears in the above-identified patent and that said Letters Patent is hereby corrected as shown below:

Column 2, line 25, after "shifter" insert --of--.

Column 5, line 22, delete "multivibrator" and insert --multi-vibrator-- therefor.

Column 6, line 56, change "2" to --22--.

In the Claims:

Column 8, line 58, after "wherein" insert --said--.

Signed and Sealed this

Fourteenth Day of September, 1993

Attest:

BRUCE LEHMAN

Attesting Officer

Commissioner of Patents and Trademarks